United States Patent [19]

Pearson et al.

[11] Patent Number: 4,519,989
[45] Date of Patent: May 28, 1985

[54] REMOVAL OF ORGANIC CONTAMINANTS FROM BAUXITE AND OTHER ORES

[75] Inventors: Alan Pearson; Paul J. The, both of Murrysville, Pa.

[73] Assignee: Aluminum Company of America, Pittsburgh, Pa.

[21] Appl. No.: 468,312

[22] Filed: Feb. 22, 1983

[51] Int. Cl.$^3$ .................................................. C01F 7/06
[52] U.S. Cl. ..................... 423/121; 423/127; 423/129; 423/130
[58] Field of Search .................. 423/121, 127, 130

[56] References Cited

U.S. PATENT DOCUMENTS

| 1,757,373 | 5/1930 | Kriegsheim et al. | 423/131 |
| 3,120,996 | 2/1964 | Porter | 423/121 |
| 3,357,792 | 12/1967 | Gebefugi | 423/121 |
| 3,773,691 | 11/1973 | Leach | 252/463 |
| 4,053,375 | 10/1977 | Roberts et al. | 204/67 |
| 4,335,082 | 6/1982 | Matyasi et al. | 423/122 |

FOREIGN PATENT DOCUMENTS

| 269395 | 6/1964 | Australia | 423/121 |
| 479731 | 12/1975 | U.S.S.R. | 423/121 |

OTHER PUBLICATIONS

Holbrook et al., "Bureau of Mines, RI6280", 1963, U.S. Dept. of Interior, Wash., D.C., 20 pp.
Edwards, Junius David; Frary, Francis C.; and Jeffries, Zay, "Aluminum and Its Production", *The Aluminum Industry, Chemical Engineering Series*, McGraw-Hill Book Company, New York, 1930, pp. 118 and 119.

*Primary Examiner*—Herbert T. Carter
*Attorney, Agent, or Firm*—Glenn E. Klepac

[57] ABSTRACT

A process for removing organic contaminants from a mineral ore such as bauxite. The ore is washed with an aqueous solution containing caustic soda, sodium carbonate or mixtures thereof in an amount up to about 80 g/l total alkali content (expressed as sodium carbonate equivalent). The ore is preferably washed at a temperature of about 95° C. for about 5 hours with a solution containing about 20 g/l total alkali content. In a preferred embodiment, the ore is separated from a rinse solution containing degradation products of organic contaminants, and the washed ore is then dissolved in a caustic solution to produce Bayer process liquor. This process provides a means to reduce the organic carbon concentration in Bayer process liquor, with resultant increase in productivity of the Bayer process.

18 Claims, 1 Drawing Figure

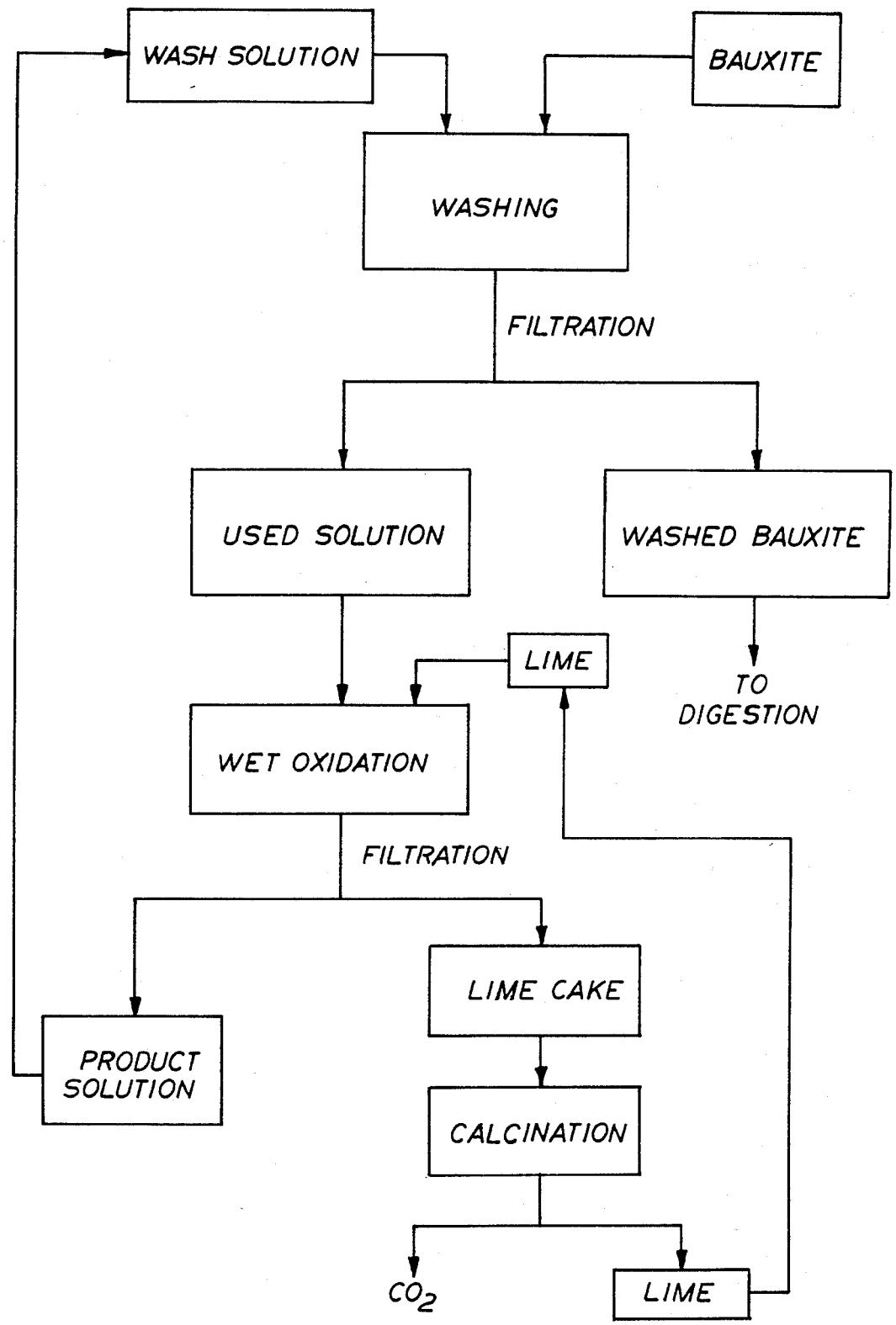

REMOVAL OF ORGANIC CONTAMINANTS FROM BAUXITE AND OTHER ORES

BACKGROUND OF THE INVENTION

Bauxite as mined generally contains from about 0.1 to 0.3 wt. % of organic compounds expressed as organic carbon, but occasionally organic carbon contents of up to about 0.6% are found. It is generally believed that the organic compounds are present in the form of humic substances. Typically, on digestion of bauxite in the Bayer process, about half of these organic compounds are extracted into the liquor. With recycling of the Bayer liquor, the concentration of these humic substances and their degradation products build up to an equilibrium concentration which depends upon the amount of organic compounds present in the bauxite and organic losses during processing.

There are other possible sources of organic compounds in Bayer liquor. These sources include organic compounds added as flocculating and anti-foaming agents. However, such compounds represent only a small portion of the total organic carbon content in recycled Bayer liquor.

The accumulated humic matter and its breakdown products together with other organic compounds in Bayer liquor are known to cause numerous process problems. Difficulties caused by these organic impurities in Bayer liquor are, for example, low alumina yield, production of excessive fines, poor red mud settling, high calcium and sodium oxide levels in calcined alumina, caustic loss due to the formation of sodium organic compounds, colored aluminum trihydroxide, increased liquor density, viscosity and boiling point, and foaming of the liquor.

Numerous methods are known in the prior art for controlling organic carbon impurities in Bayer process liquor. These methods include treatment of the process liquor with sodium hypochlorite or other oxidizing agents such as oxygen or air (U.S. Pat. No. 4,335,082). Another process, described in German Patent Off. No. 2,415,872 involves the addition of a calcium compound to the process liquor to remove humic matter as insoluble calcium compounds. U.S. Pat. No. 4,046,855 describes removal of humic compounds by addition of a magnesium compound to the liquor. U.S. Pat. No. 4,101,629 discloses purification of Bayer liquor by addition of a barium compound. Still more methods can be found in the literature which involve removal of oxalates, desalting processes, and using an ion exchanger. All of these methods involve removal of organic compounds from process liquor. A method in which organic compounds are removed from bauxite itself involves roasting the bauxite at an elevated temperature. However, this process requires a high energy consumption, and it lowers the recovery of alumina, thereby making it less attractive from a cost standpoint.

It is a principal object of the present invention to provide a process for removing substantial amounts of organic matter from an aluminum-containing ore such as bauxite without reducing substantially the alumina content of the ore.

A related object of the invention is to provide an efficient and economical process for removing organic contaminants from mineral ore.

Another object of the invention is to provide a beneficial use for plant lake water formed in the Bayer process.

Additional objects and advantages of the invention will be apparent to persons skilled in the art from the following specification.

SUMMARY OF THE INVENTION

In accordance with the present invention, a substantial amount of organic matter is removed from a mineral ore in a pre-treatment involving mildly caustic conditions. The process of the invention is especially designed for use in treating aluminum-containing ores such as bauxite but may also find application to other ores. By proper choice of operating conditions in the pre-treatment of bauxite, little or no aluminum is removed and a simple, effective separation of organic material from the ore is accomplished. A rinse solution containing degradation products of the organic contaminants can then be separated from the washed bauxite and treated to eliminate organic components. The process of the invention results in an insignificant loss of alumina so that the purified bauxite is useful for extraction of alumina in the Bayer process.

The process of the invention is performed by washing a mineral ore with an aqueous solution containing dissolved caustic soda, sodium carbonate or mixtures thereof in an amount up to about 80 g/l total alkali content. The alkali content is expressed in terms of the sodium carbonate equivalent. The process is especially suitable for treatment of aluminum-containing ores such as bauxite. In order to reduce extraction of alumina from the aluminum-containing ore, total alkali content of the solution is generally maintained below about 40 g/l. In a preferred embodiment, the total alkali content is about 8-32 g/l and a particularly preferred solution has a concentration of about 20 g/l.

The process of the invention is generally carried out by exposing the bauxite to the solution for at least 1 hour, preferably about 2-20 hours. In a particularly preferred embodiment, the ore is maintained in contact with the solution for about 5 hours.

The process is generally carried out at an elevated temperature to reduce the time required for extracting material from the ore. A preferred temperature is in the range of about 70°-110° C. In a particularly preferred embodiment, a solution comprising about 12 g/l caustic soda (expressed as sodium carbonate equivalent) and about 8 g/l sodium carbonate is maintained in contact with the ore for about 5 hours at a temperature of about 95° C.

The aqueous wash solution may comprise used plant lake water produced as a by-product of the Bayer process. This lake water generally has a total alkali content of about 20 g/l. An incidental benefit of the invention is that it constitutes an advantageous use for this plant lake water.

Optionally, the used solution containing degradation products of the organic contaminants may be treated by wet oxidation and added lime, thereby precipitating lime cake containing calcium carbonate, calcium aluminate and organic degradation products. The lime cake is then separated from the used solution to form a product solution containing caustic soda and sodium carbonate. This product solution is then recycled for use as a wash solution in treating the ore. The lime cake is calcined to convert calcium carbonate to lime which is useful for addition to the used solution. A suitable calcination temperature is about 1000° C.

Alumina is extracted from the treated ore in the Bayer process. A first step of this process generally constitutes dissolving the ore in caustic solution containing caustic soda or a mixture of caustic soda and sodium carbonate in a concentration of about 100–400 g/l total alkali content. The caustic solution usually has a total alkali content of about 140–240 g/l. Concentrations in the range of about 160–190 g/l are preferred.

BRIEF DESCRIPTION OF THE DRAWING

The sole FIGURE is a flow sheet diagram, illustrating a preferred embodiment of the process of the invention.

DETAILED DESCRIPTION OF THE PREFERRED EMBODIMENT

The present invention comprises a process for removing organic contaminants from mineral ores. The process is practiced by washing the ore with an aqueous wash solution containing caustic soda, sodium carbonate or mixtures thereof in an amount up to about 80 g/l total alkali content (expressed as sodium carbonate equivalent). Although the process is designed for washing aluminum-containing ores such as bauxite, the process may also be applicable to other mineral ores in which organic contamination presents a problem.

The wash solution may be caustic soda liquor used in the Bayer process or plant lake water produced as a result of the process. The latter solution typically has a composition of about 6 g/l $Al_2O_3$, about 12 g/l caustic soda and about 20 g/l total alkali content expressed as the sodium carbonate equivalent. Plant lake water is preferred because it is readily available at Bayer plants and because it is easy to separate from the solid ore by filtration.

The mixed bauxite and wash solution may range in consistency from a thick slurry to a thin slurry. A slurry comprising about 30–40% by weight of solids is preferred. The mixture is then held until a substantial fraction of organic contaminants in the bauxite have been dissolved in the wash solution. Holding time required depends upon the temperature, the concentration of active ingredients in the wash solution, and the nature of organic contaminants in the bauxite.

In a preferred embodiment, satisfactory results are obtainable by holding the ore in contact with the wash solution for about 5 hours at about 95° C. The holding time is generally at least 1 hour and preferably in the range of about 2–20 hours. Elevated temperatures are preferred in order to reduce holding time. Temperatures in the range of about 70°–110° C. are preferred.

The washed bauxite is suitable for extraction of alumina. When alumina is extracted from bauxite in accordance with the Bayer process, the first step generally constitutes dissolving the ore in a caustic solution containing caustic soda or a mixture of caustic soda and sodium carbonate in a concentration of about 100–400 g/l total alkali content (expressed as sodium carbonate equivalent). The caustic solution usually has a total alkali content of about 140–240 g/l. Concentrations in the range of about 160–190 g/l are preferred.

Dissolution of the washed bauxite in caustic solution results in Bayer liquor having a reduced concentration of humates and other organic contaminants. Productivity of the entire Bayer process is improved when alumina is produced from bauxite treated in accordance with our invention.

The following example describes a preferred embodiment of our invention in greater detail and shows the efficiency to be expected from the process of the invention in enhancing the quality of mineral ore by removing organic compounds.

EXAMPLE

About 620 grams of bauxite having the composition shown in Table I were mixed in a stainless steel bomb with an aqueous wash solution containing 6 g/l $Al_2O_3$, 12 g/l caustic soda and 20 g/l total alkali content expressed as sodium carbonate equivalent. The resulting slurry contained about 35 wt % solids. The stainless steel bomb was agitated for about 5 hours at 95° C. The bauxite was then filtered using No. 1 Whatman paper and washed with a sufficient amount of hot distilled water to displace the entrained wash solution. The solids were dried, weighed and submitted for chemical analyses.

TABLE I

| Bauxite Analysis | |
|---|---|
| Element (As Oxide) | Composition (wt %) |
| $SiO_2$ | 2.96 |
| $Fe_2O_3$ | 15.2 |
| $TiO_2$ | 2.30 |
| $Al_2O_3$ | 50.5 |
| CaO | 0.03 |
| $P_2O_5$ | 0.06 |
| $K_2O$ | 0.01 |
| MnO | 0.02 |
| CuO | 0.0 |
| ZnO | 0.0 |
| $ZrO_2$ | 0.1 |
| $Cr_2O_3$ | 0.06 |
| $Ga_2O_3$ | 0.01 |
| LOF | 29.0 |
| Organic C | 0.6 |

The untreated bauxite contained 0.6 wt % of organic compounds expressed as organic carbon. The treated bauxite contained 0.3 wt % of organic carbon, indicating that about half of the organic carbon in the bauxite was extracted into the solution. The used solution produced as a result of the washing process had an organic content of about 2 g/l. The used solution also demonstrated the following analyses: 7 g/l $Al_2O_3$, 12 g/l caustic soda and 20 g/l total alkali content. The slight increase in $Al_2O_3$ content in the used solution demonstrates the need to control time and temperature of holding in order to minimize extraction of alumina from the bauxite.

Organic carbon in the used solution can be removed by wet oxidation at an elevated temperature, with addition of lime. Some suitable conditions for wet oxidation are 230° C. under 200 psi (1.38 mpa) oxygen partial pressure for about 1–2 hours with addition of about 10 g/l lime. If desired, the wet oxidation may be accomplished by other preferred oxidizing means, including addition of a chemical oxidizing agent such as sodium hypochlorite. The purpose of adding lime during wet oxidation is to causticize the solution, which is carbonated as a result of carbon dioxide formed during the wet oxidation process. This process results in formation of a precipitate comprising mostly calcium carbonate with slight amounts of calcium aluminate and calcium organic compounds. The precipitate is separated from the solution by filtration, forming a solid lime cake and a liquid product solution.

The product solution has approximately the same composition as the wash solution used to treat the bauxite and can be recycled for such purpose. The lime cake can be calcined at 1000° C. to produce carbon dioxide and lime. The lime thus formed can then be recycled for causticizing the oxidized used solution.

The following sequence of chemical reactions is predicted to describe the oxidation process for treating the used solution. Organic compounds present in the used solution are represented in simplified form in reaction (1) as a single segment of a long chain compound containing carbon, hydrogen and oxygen.

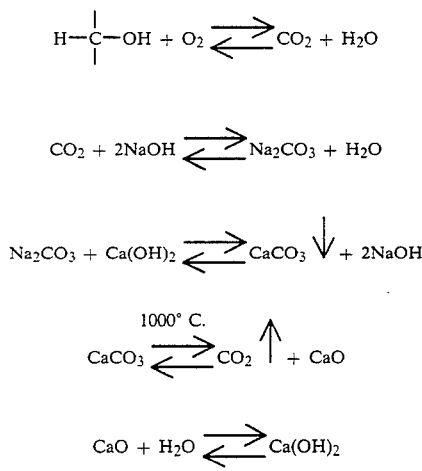

The overall reaction can be summarized as follows:

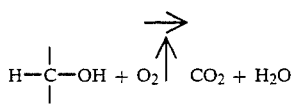

The foregoing detailed description of our invention has been made with reference to a single preferred embodiment. Persons skilled in the art will understand that numerous changes and modifications can be made without departing from the spirit and scope of the following claims.

What is claimed is:

1. A process for making a Bayer process liquor having a decreased concentration of organic contaminants, said process comprising
   (a) washing bauxite in a slurry comprising the bauxite and an aqueous wash solution containing caustic soda, sodium carbonate or mixtures thereof in an amount up to about 80 g/l total alkali content (expressed as sodium carbonate equivalent), thereby to remove organic contaminants from said bauxite,
   (b) separating from the slurry a used solution containing degradation products of said organic contaminants, and
   (c) dissolving the washed bauxite in a caustic solution containing caustic soda or a mixture of caustic soda and sodium carbonate in a concentration of about 100–400 g/l total alkali content (expressed as sodium carbonate equivalent), thereby to produce Bayer process liquor.

2. The process of claim 1 wherein the total alkali content of said wash solution is up to about 40 g/l.

3. The process of claim 1 wherein the total alkali content of said wash solution is about 8–32 g/l.

4. The process of claim 1 wherein the total alkali content of said wash solution is about 20 g/l.

5. The process of claim 1 wherein the ore is exposed to the wash solution in step (a) for at least 1 hour.

6. The process of claim 1 wherein the ore is exposed to the wash solution in step (a) for about 2–20 hours.

7. The process of claim 1 wherein the ore is exposed to the wash solution in step (a) for about 5 hours.

8. The process of claim 1 wherein step (a) is carried out at an elevated temperature.

9. The process of claim 1 wherein step (a) is carried out at a temperature of about 70°–110° C.

10. The process of claim 1 wherein step (a) is carried out at a temperature of about 95° C.

11. The process of claim 1 wherein said wash solution contains both caustic soda and sodium carbonate.

12. The process of claim 1 wherein said wash solution comprises plant lake water produced in the Bayer process.

13. The process of claim 1 wherein said wash solution comprises about 12 g/l caustic soda (expressed as sodium carbonate equivalent), about 8 g/l sodium carbonate, and about 6 g/l $Al_2O_3$.

14. The process of claim 1 further comprising
   (e) oxidizing the used solution and adding lime to the used solution, thereby precipitating a lime cake containing calcium carbonate,
   (f) separating a product solution containing caustic soda and sodium carbonate from the cake, and
   (g) recycling the product solution to step (a).

15. The process of claim 14 further comprising
   (h) calcining the lime cake to convert the calcium carbonate to lime, and
   (i) recycling the lime formed in step (h) to step (e).

16. The process of claim 1 wherein said wash solution contains both caustic soda and sodium carbonate in a total alkali content of about 8–32 g/l, and said bauxite is exposed to the wash solution for at least one hour at an elevated temperature.

17. The process of claim 16 wherein step (a) is carried out at a temperature of about 70°–110° C.

18. The process of claim 1 wherein the bauxite and wash solution of step (a) are mixed into a slurry comprising about 30–40 wt % solid matter.

* * * * *